United States Patent
Pang et al.

(10) Patent No.: US 12,321,366 B2
(45) Date of Patent: Jun. 3, 2025

(54) TRANSACTION BASED PROCESSING USING ASYNCHRONOUS MICROSERVICES

(71) Applicant: HONEYWELL INTERNATIONAL INC., Morris Plains, NJ (US)

(72) Inventors: Yu Pang, Morris Plains, NJ (US); Shao Min Sun, Morris Plains, NJ (US); Weilin Zhang, Morris Plains, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 169 days.

(21) Appl. No.: 17/759,495

(22) PCT Filed: Feb. 4, 2020

(86) PCT No.: PCT/CN2020/074275
§ 371 (c)(1),
(2) Date: Jul. 26, 2022

(87) PCT Pub. No.: WO2021/155496
PCT Pub. Date: Aug. 12, 2021

(65) Prior Publication Data
US 2023/0058475 A1 Feb. 23, 2023

(51) Int. Cl.
*G06F 16/27* (2019.01)
*G06F 9/54* (2006.01)

(52) U.S. Cl.
CPC .......... *G06F 16/273* (2019.01); *G06F 9/546* (2013.01)

(58) Field of Classification Search
None
See application file for complete search history.

(56) References Cited

U.S. PATENT DOCUMENTS

| 10,796,276 B1 * | 10/2020 | Singh | G06Q 10/0633 |
| 10,796,277 B1 * | 10/2020 | Singh | G06Q 10/06316 |
| 2003/0105800 A1 * | 6/2003 | Cullen | H04L 45/54 |
| | | | 709/201 |

(Continued)

FOREIGN PATENT DOCUMENTS

| CN | 106874076 A | 6/2017 |
| CN | 106993023 A | 7/2017 |

OTHER PUBLICATIONS

NPL-Malav, "Need of messaging queue in Microservices Architecture", Dec. 23, 2017 (Year: 2017).*

*Primary Examiner* — Polina G Peach
*Assistant Examiner* — Anugeetha Kunjithapatham
(74) *Attorney, Agent, or Firm* — Seager, Tufte & Wickhem, LLP

(57) ABSTRACT

An example of communicating transaction data between a first service and a second service includes receiving transactions of first service, and processing the received transactions and storing the results in a database of the first service. For at least some of the received transactions, corresponding transaction messages are produced for processing by the second service, and tracking that each of the transaction messages is provided to a message queue. The transaction messages are received from the message queue and are processed using the second service, and the results are stored in a database of the second service. When there are duplicate transaction messages received from the message queue, the database of the second service only stores the results of one of the duplicate transaction messages.

12 Claims, 5 Drawing Sheets

(56) References Cited

U.S. PATENT DOCUMENTS

| | | | |
|---|---|---|---|
| 2017/0103113 A1* | 4/2017 | Greenblatt | G06F 40/143 |
| 2017/0195438 A1* | 7/2017 | Schneider | H04L 67/62 |
| 2018/0239658 A1* | 8/2018 | Whitner | G06F 11/3409 |
| 2018/0307514 A1* | 10/2018 | Koutyrine | G06F 11/0706 |
| 2019/0089809 A1* | 3/2019 | Theebaprakasam | G06F 11/3006 |
| 2019/0243688 A1* | 8/2019 | Karmarkar | G06F 9/5083 |
| 2019/0306010 A1* | 10/2019 | Medam | G06F 9/546 |
| 2019/0334789 A1* | 10/2019 | Roche | G06F 18/23 |
| 2020/0192732 A1* | 6/2020 | Acosta | G06F 9/546 |
| 2020/0209816 A1* | 7/2020 | Cebasek | G05B 19/042 |
| 2020/0257676 A1* | 8/2020 | Zhang | G06F 16/2365 |
| 2021/0165680 A1* | 6/2021 | Laschinger | H04L 67/10 |

* cited by examiner

TRANSACTION BASED PROCESSING USING ASYNCHRONOUS MICROSERVICES

TECHNICAL FIELD

The present disclosure generally relates to processing of transactions, and more particularly, to methods and systems for processing transactions using a plurality of asynchronous microservices.

BACKGROUND

Various computing services often work together to provide a desired function. This requires that the computing services communicate with one another and operate in a coordinated way. In many cases, a transaction is received at a first computing service, and in order to complete the transaction, part of the transaction is processed by the first computing service and part of the transaction is processed by a second computing service. For example, a building related computing service may receive and process alarm transaction, and in doing so, may use a separate workorder generation computing service to create workorders to address the alarms.

In some cases, the first and second computing services are from different vendors and operate asynchronously from one another. In such a system, there can be difficulties in ensuring data consistency between the various computing services. For example, there can be difficulties in ensuring that each of the alarm transactions is properly processed and recorded by the building related computing service and the workorder generation computing service, while ensuring that duplicate transactions are not processed by either of the computing services due to processing anomalies that might occur. Accordingly, a need exists for improved ways for processing transactions across a plurality of asynchronous computing services.

SUMMARY

The present disclosure relates generally to methods and systems for processing transactions using a plurality of asynchronous microservices. In one example, a system maintains data consistency between a first microservice that has a first microservice database and a second microservice that has a second microservice database. The first microservice operates asynchronously with the second microservice and the first microservice initiates transactions that are to be processed by the second microservice. The system includes a transaction initiator that is configured to processes transactions of the first microservice, wherein at least some of the transactions of the first microservice, when processed, update the first microservice database and also produce a corresponding transaction messages for processing by the second microservice. The transaction initiator may record the transaction messages in a first transaction table that includes a transaction entry for each transaction message in the first transaction table, and each transaction entry in the first transaction table may include a corresponding transaction identifier and a transaction message status, wherein the transaction message status designates finished or unfinished. The illustrative system includes a transaction executor that is configured to access the first transaction table and provide the transaction messages that have a transaction message status of unfinished into a message queue. The transaction executor may be configured to update the transaction message status in the first transaction table to finished for those transaction messages that have been placed in the message queue. The illustrative system also includes a transaction processor that is configured to receive the transaction messages from the message queue and to process those transaction messages using the second microservice, wherein at least some of the transaction messages, when processed, update the second microservice database. The transaction processor may be further configured to record each of the transaction messages in a second transaction table that includes a transaction entry for each transaction message, wherein each transaction entry includes the transaction identifier of the corresponding transaction message. The transaction processor may be configured to check, for each transaction message received from the message queue, whether the second transaction table already has a transaction entry that has a matching transaction identifier, and if so, cause the second microservice database to include updates from only one of the matching transactions.

In another example, a method of communicating transaction data between a first service and a second service may include receiving transactions of a first service, and processing the received transactions and storing the results in a database of the first service. For at least some of the received transactions, corresponding transaction messages are produced for processing by the second service and tracked to ensure that each of the transaction messages is provided to a message queue. The transaction messages are received from the message queue by the second service, processed by the second service, and the results are stored in a database of the second service. When there are duplicate transaction messages received from the message queue, the database of the second service is caused to only store the results of one of the duplicate transaction messages.

In another example, a system provides communication of transaction data between a first service and a second service. The system includes a transaction initiator that is configured to receive transactions from a first service. The transaction initiator may include a first transaction table and a first database. The transaction initiator is configured to store transaction messages corresponding to the received transactions within the first transaction table. The first transaction table includes for each transaction message a transaction message status. The transaction initiator may be configured to update the first database and store the transaction messages within the first transaction table in a first database transaction.

The illustrative system further includes a transaction executor that is configured to start a schedule service in which the transaction executor is configured, for each of those transaction messages in the first transaction table that have a transaction message status of unfinished, to send the transaction messages to a message queue and to update the transaction message status to finished.

The system further includes a transaction processor that is configured to receive transaction messages from the message queue, where each transaction message includes a corresponding transaction identifier. The transaction processor may include a second transaction table and a second database, where the transaction processor is configured to, in response to receiving a transaction message from the message queue, update the second database and add the corresponding transaction identifier to the second transaction table in a second database transaction. When there are duplicate transaction messages received from the message queue, as indicated by a duplicate transaction identifier in the second transaction table, the transaction processor may only update the second database based on one of the duplicate transaction messages.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
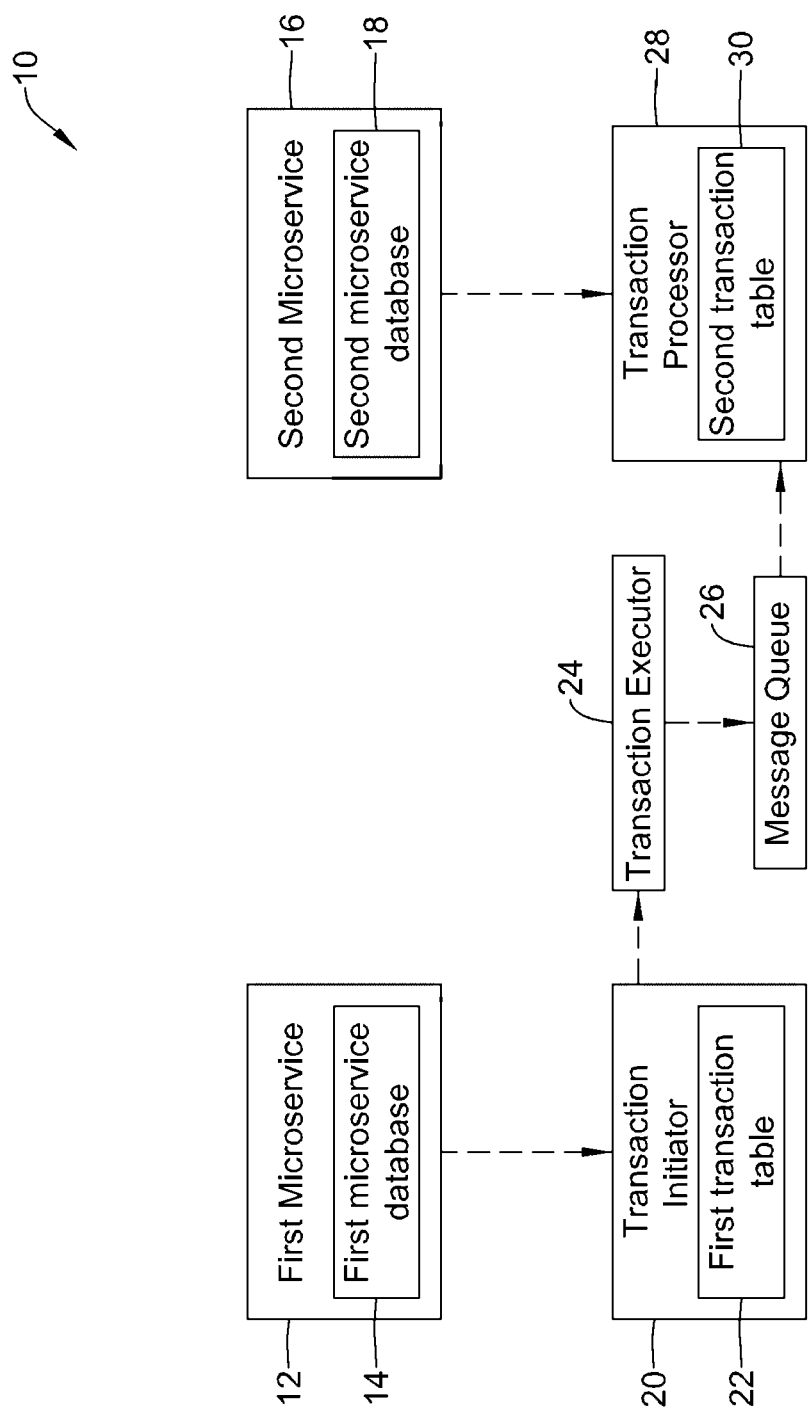
FIG. 1 is a schematic block diagram of an illustrative system for processing transaction using a first microservice and a second microservice.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of a system 10 for processing transaction using a first microservice 12 having a first microservice database 14 and a second microservice 16 having a second microservice database 18. The first microservice 12 may be any of a number of different platforms. As an example, the first microservice 12 may generally represent a Building Performance Suite (BPS) generating alarm data and/or messages. The second microservice 16 may represent a different platform with which the first microservice 12 needs to communicate. As an example, the second microservice 16 may be a platform that generates workorders in response to the alarm data or messages of the first microservice 12. These are just examples. In some instances, the first microservice 12 operates asynchronously with the second microservice 16. The first microservice 12, when processing at least some of the transactions, may initiate transaction messages that are to be processed by the second microservice 16.

As illustrated, the system 10 may includes a transaction initiator 20 that is configured to process transactions of the first microservice 12 (e.g. alarm and/or other transactions). The illustrative transaction initiator 20 includes a first transaction table 22. At least some of the transactions of the first microservice 12, when processed, may update the first microservice database 14 and may also produce a corresponding transaction message for processing by the second microservice 16. The transaction initiator may record the transaction messages in the first transaction table 22, and each transaction entry in the first transaction table 22 may include, for example, a corresponding transaction identifier, a transaction message status, and transaction data (e.g. data needed to create a corresponding workorder). The transaction message status may, for example, designate that the transaction message is considered to be finished (e.g. sent to the second microservice) or unfinished (e.g. not het sent to the second microservice), although other status designators may be used contemplated. In some cases, the transaction initiator 20 updates the first microservice database 14, produces the corresponding transaction messages and records the transaction messages in the first transaction table 22 via one or more database transactions that ensure data consistency. In this context, data consistency means that for each transaction, the first microservice database 14 is appropriately updated with no double entries, and the transaction message(s) is appropriately recorded in the first transaction table 22 with no double entries.

As noted above, each transaction entry in the first transaction table 22 may include transaction data. For example, the transaction data may, if present, include workorder data that corresponds to the corresponding alarm. At least some of the transactions of the first microservice 12 may be initiated by a corresponding alarm issued by a building management system.

The illustrative system 10 also includes a transaction executor 24 that is configured to access the first transaction table 22 and to provide the transaction messages that have a transaction message status of "unfinished" (or other designator) into a message queue 26. In some cases, the transaction executor may be configured to update the transaction message status in the first transaction table 22 to "finished" (or other designator) for those transaction messages that have been placed in the message queue 26. In some instances, the transaction executor 24 may include a schedule service that schedules when the transaction executor 24 accesses the first transaction table 22 and provides the transaction messages that have a transaction message status of "unfinished" into the message queue 26. The schedule service may schedule the transaction executor 24 to accesses the first transaction table 22 and provide the transaction messages that have a transaction message status of "unfinished" into the message queue 26 at predetermined scheduled times. The predetermined scheduled times may include periodic times, such as but not limited to, every one minute, every ten minutes, every hour, every day or any other period time. In some cases, the predetermined scheduled times are not necessarily periodic. In some cases, the scheduled times are not predetermined, but rather may depend on processing load on the first and/or second microservices. In some cases, the scheduled times may be increased during certain times of one or more days and decreased during other times. These are just examples.

The illustrative system 10 further includes a transaction processor 28 that is configured to receive the transaction messages from the message queue 26 and to process those transaction messages using the second microservice 16. At least some of the transaction messages, when processed, update the second microservice database 18. The transaction processor 28 may also be configured to record each of the transaction messages in a corresponding transaction entry in a second transaction table 30. Each transaction entry in the second transaction table 30 may include the transaction identifier of the corresponding transaction message. This transaction identifier may the same or different from the transaction identifier corresponding to the same transaction message in the first transaction table 22. In some instances, the transaction processor 28 may update the second microservice database 18 and record each of the transaction messages in the second transaction table 30 via one or more database transactions that ensure data consistency. In some instances, the transaction processor 28 may further be configured to check, for each transaction message received from the message queue 26, whether the second transaction table 30 already has a transaction entry that has a matching transaction identifier, and if so, cause the second microservice database 18 to include updates from only one of the matching transaction messages.

Figure 2:
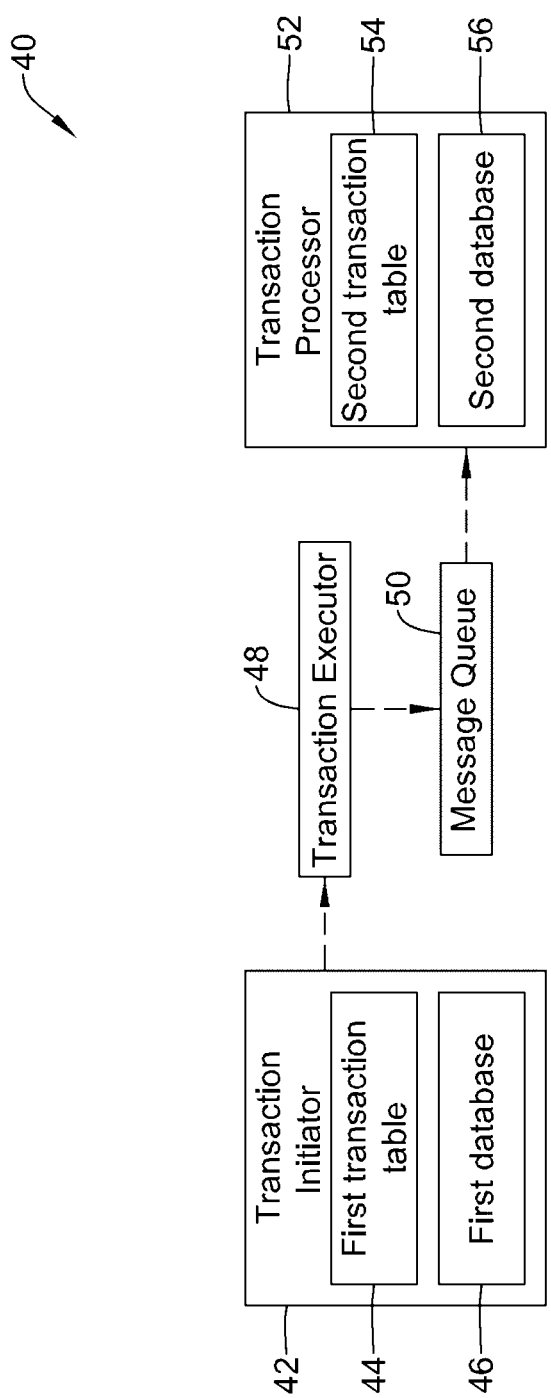
FIG. 2 is a schematic block diagram of an illustrative system for processing transaction using a first microservice and a second microservice.

FIG. 2 is a schematic block diagram of an illustrative system 40 for processing transaction using a first service and a second service. The first service and the second service may each be any of a number of different services operating on any number of different platforms. As an example, the first service may generally represent a Building Performance Suite (BPS) generating alarm data or messages. The second service may represent a different platform with which the first service needs to communicate. As an example, the second service may be a platform that generates workorders to address the alarms of the first service.

The illustrative system 40 includes a transaction initiator 42 that is configured to receive transactions from a first service. The illustrative transaction initiator 42 includes a first transaction table 44 and a first database 46. The transaction initiator 42 may be configured to store transaction messages corresponding to the received transactions within the first transaction table 44, the first transaction table 44 including for each transaction message a transaction message status. In some cases, the transaction initiator 42 may update the first database 46 and store the transaction messages within the first transaction table 44 in a first database transaction.

The illustrative system 40 further includes a transaction executor 48 that may be configured to start a schedule service in which the transaction executor 48 is configured to, for each of those transaction messages in the first transaction table 44 that have a transaction message status of "unfinished" (or other designator), to send the transaction messages to a message queue 50 and to update the transaction message status to "finished" (or other designator).

The illustrative system 40 further includes a transaction processor 52 that is configured to receive transaction messages from the message queue 50, where each transaction message includes a corresponding transaction identifier. The transaction processor 52 may also include a second transaction table 54 and a second database 56. In some cases, the transaction processor 52 may be configured to, in response to receiving a transaction message from the message queue 50, update the second database 56 and add the corresponding transaction identifier to the second transaction table 54 in a second database transaction. When there are duplicate transaction messages received from the message queue 50, as indicated by a duplicate transaction identifier in the second transaction table 54, the transaction processor 52 may only update the second database 56 based on one of the duplicate transaction messages.

Figure 3:
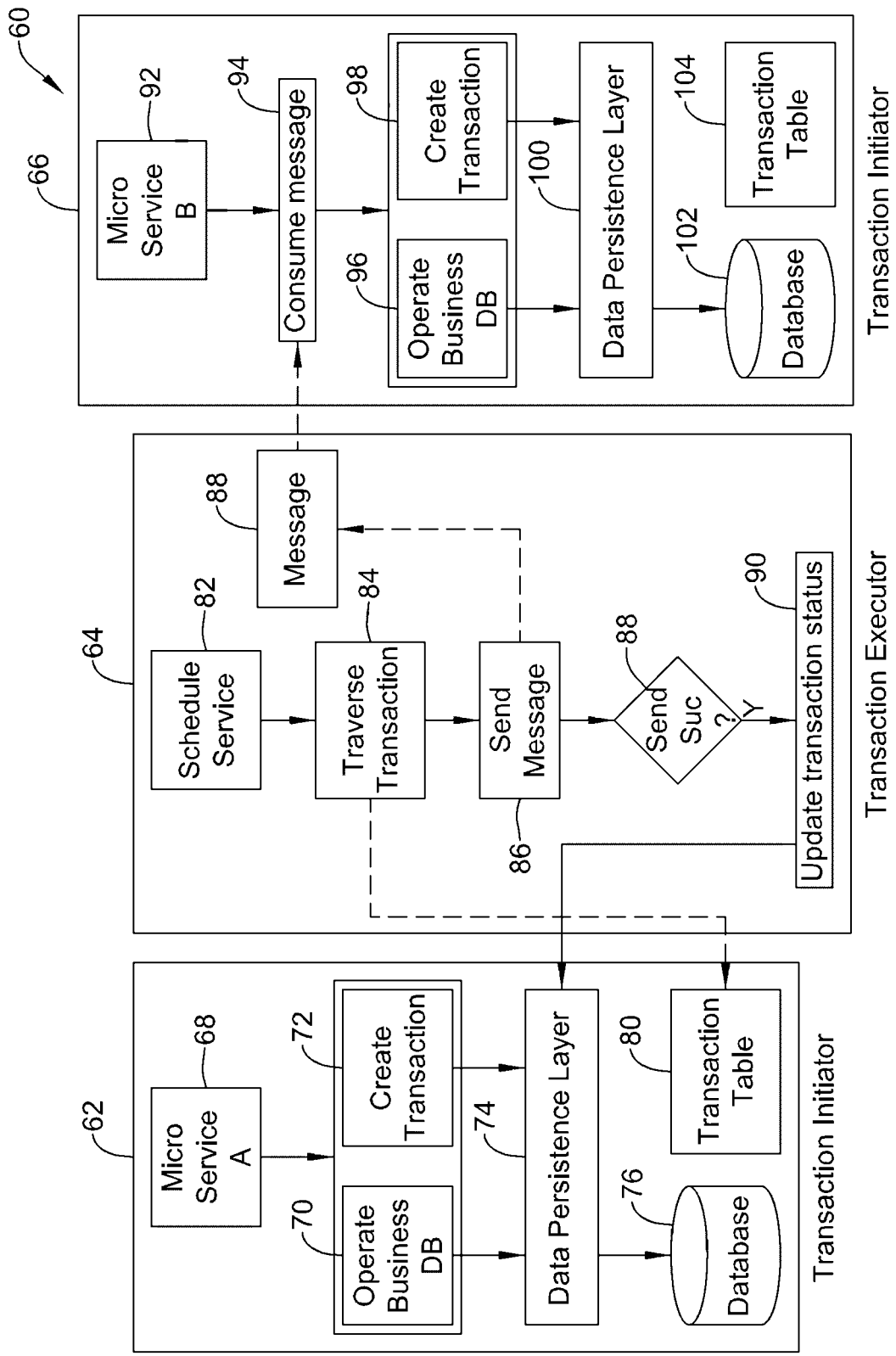
FIG. 3 is a schematic block diagram of an illustrative architecture useful for processing transaction using a first microservice A and a second microservice B.

FIG. 3 is a schematic block diagram showing an architecture 60 that may be useful for processing transaction using a first microservice A and a second microservice B. The architecture 60 includes a transaction initiator 62, a transaction executor 64 and a transaction processor 66. It will be appreciated that the transaction initiator 62 may be similar to and/or be an example of the transaction initiator 20 (FIG. 1) and/or the transaction initiator 42 (FIG. 2). Similarly, the transaction executor 64 may be similar to and/or be an example of the transaction executor 24 (FIG. 1) and/or the transaction executor 48 (FIG. 2). The transaction processor 66 may be similar to and/or be an example of the transaction processor 28 (FIG. 1) and/or the transaction processor 52 (FIG. 2).

As shown in FIG. 3, a microservice A 68 executes a database transaction, which results in updating a database at block 70 and creating a transaction at block 72. In the example shown, both blocks 70 and 72 communicate with a data persistence layer 74, which in some cases may include one or more files that can be used to help ensure data constancy when updating a first database 76 and/or a first transaction table 80. The first database 76 and the first transaction table 78 may function as described with respect to FIGS. 1 and 2.

In some cases, the transaction executor 64 may be configured to initiate a schedule service, as indicated at block 82. In response, the transaction executor 64 may traverses the transactions that are stored in the first transaction table 80 as indicate at block 84, causing a transaction message to be sent as indicated at block 86 to a message queue 88. At decision block 90, a determination is made as to whether the transaction message was successful passed to the message queue 88. If so, the transaction status in the first transaction table 80 is updated as indicated at block 90, sometimes via the data persistence layer 74.

As shown, a transaction processor 66 received the messages from the message queue 88, resulting in the message being consumed as indicated at block 94. The microservice B 92 may processes the transaction message, which may result in updating a database at block 96 and creating a transaction at block 98. In the example shown, both blocks 96 and 98 communicate with a data persistence layer 100, which in some cases may include one or more files that can be used to help ensure data constancy when updating a second database 102 and/or a second transaction table 104. The second database 201 and the second transaction table 104 may function as described with respect to FIGS. 1 and 2.

Figure 4:
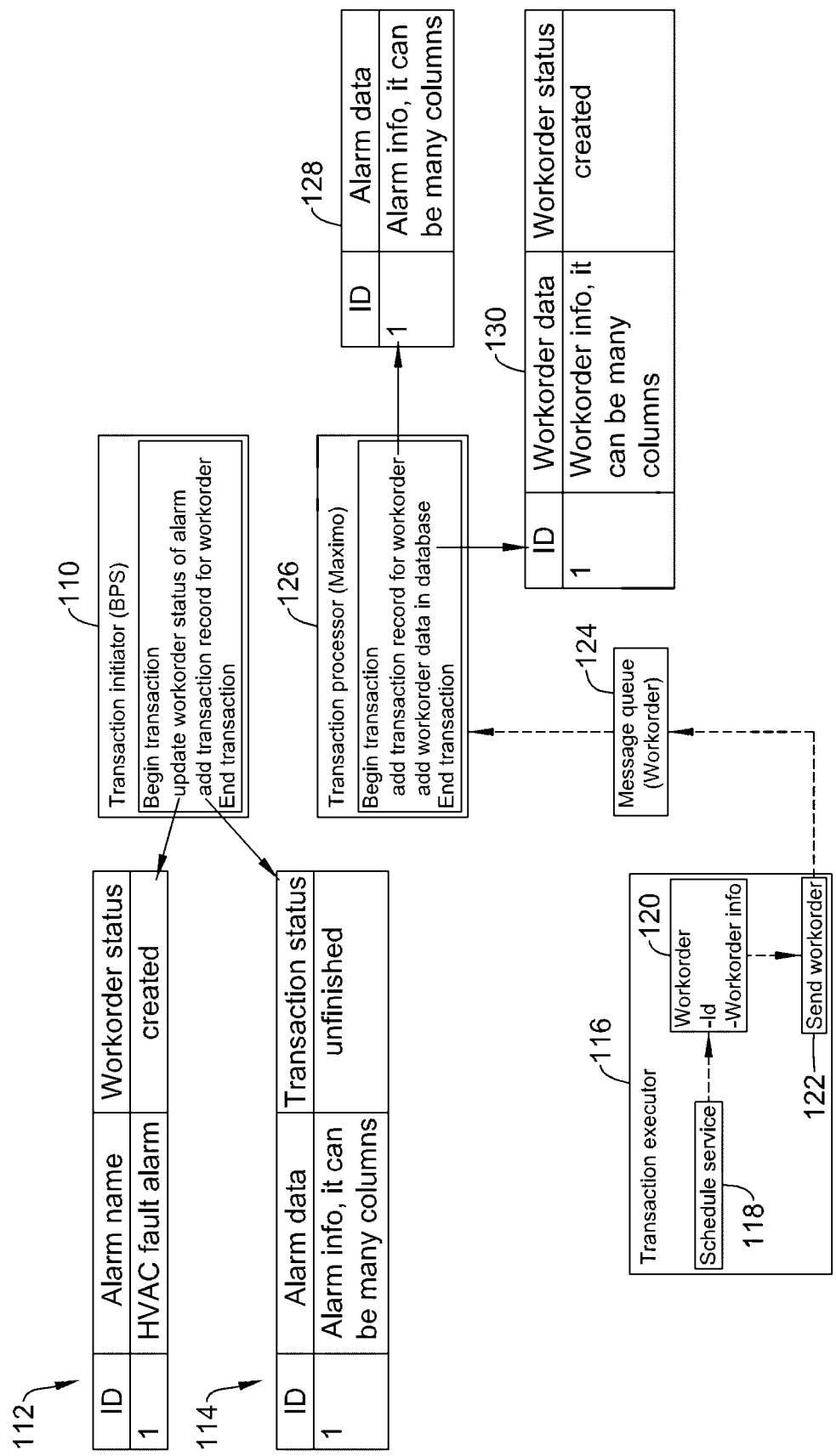
FIG. 4 is an example showing how the illustrative architecture of FIG. 3 may be applied.

FIG. 4 is an example of how the illustrative architecture of FIG. 3 may be applied, using workorder generation in response to an alarm in a BPS. When an alarm is receive, an alarm transaction is initiated. The alarm transaction not only updates an alarm database, but also creates a workorder transaction message to address the alarm. Block 112 provides a workorder transaction message summary while block 114 shows a workorder transaction message added a first transaction table. A transaction executor may periodically scans the first transaction table, as indicated at block 116. In some cases, the transaction executor may initiate a schedule service, as indicated at block 118, to perform the scans. The transaction executor may periodically retrieve the workorder transaction messages in the first transaction table that have a transaction status of "unfinished", and provide those workorder transaction messages to a message queue, as shown at 124, and then update the transaction status of those workorder transaction messages to "finished" in the first transaction table 114.

As indicated at block 126, a transaction processor, which in this example may include the Maximo™ microservice (a workorder generation service), retrieves the workorder transaction messages from the message queue. The transaction processor may add a corresponding transaction record to a second transaction table as shown at 128 and 130, including a unique transaction identifier for each workorder transaction message. The transaction processor may also update a workorder database with a corresponding workorder. The transaction processor may determine whether the workorder transaction message is a duplicate of a previous workorder transaction message by comparing the transaction identifier of the current workorder transaction message with the transaction identifiers of the workorder transaction messages already recorded in the second transaction table. If it is a duplicate, the system ensures that the workorder database only includes a workorder corresponding to one of the duplicate workorder transaction messages.

Figure 5:
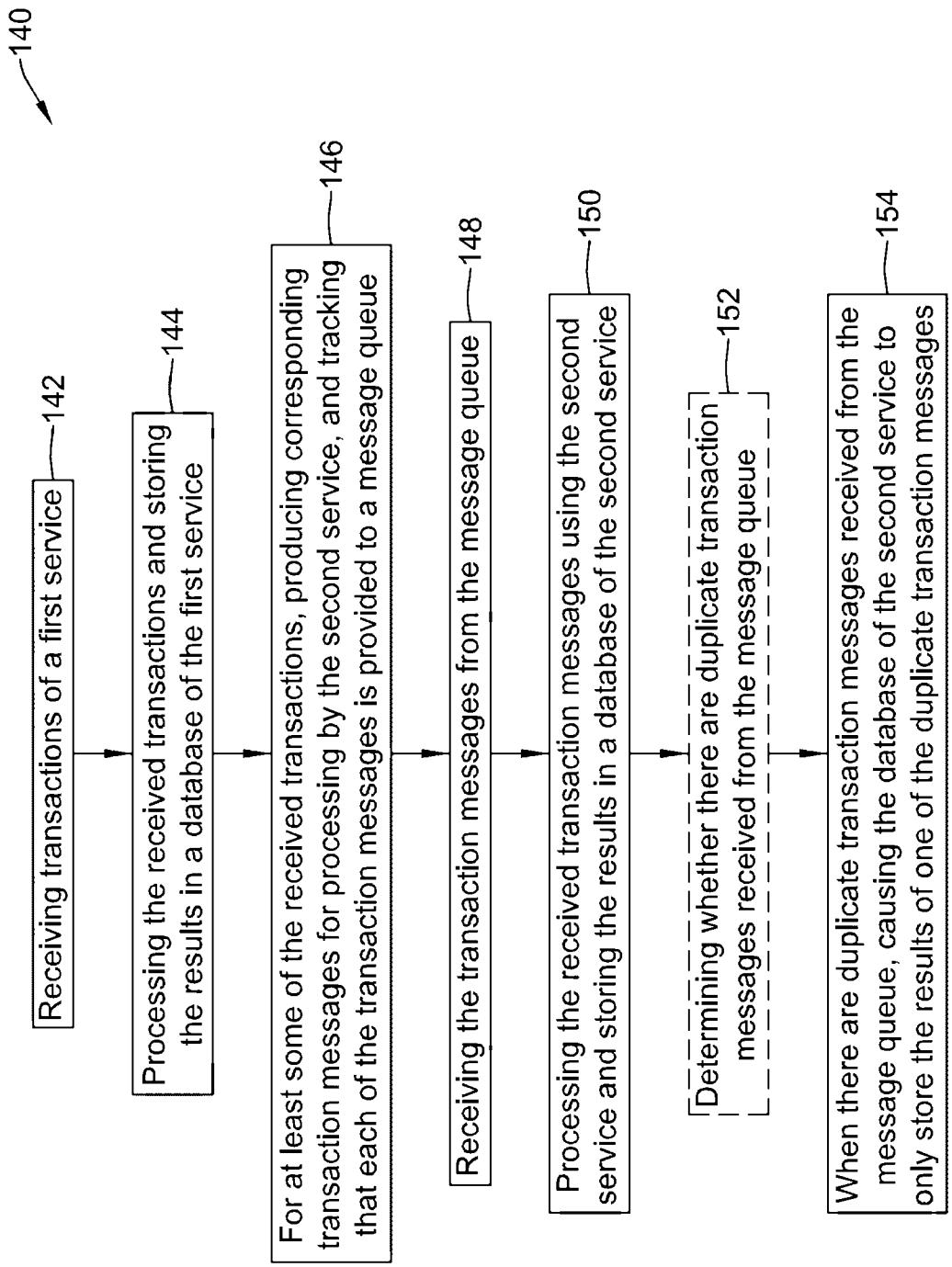
FIG. 5 is a flow diagram showing an illustrative method of processing transaction using a first microservice and a second microservice.

FIG. 5 is a flow diagram showing an illustrative method 140 of processing transaction using a first microservice and a second microservice. The illustrative method 140 includes receiving transactions of a first service, as indicated at block 142, and processing the received transactions and storing the results in a database of the first service, as indicated at block 144. For at least some of the received transactions, and as indicated at block 146, corresponding transaction messages may be produced for processing by the second service, and tracking that each of the transaction messages is provided to a message queue. In some cases, tracking that each of the transaction messages is provided to the message queue may include storing each of the transaction messages in a first transaction table, wherein each entry of the first transaction table includes a transaction message status of unfinished or finished, and wherein the transaction message status is updated to finished when the corresponding transaction message is provided to the message queue.

The transaction messages may be received from the message queue, as indicated at block 148, and the received transaction messages may be processed using the second service and storing the results in a database of the second service, as indicated at block 150. In some cases, there may be a determination made as to whether there are duplicate transaction messages received from the message queue, as indicated at block 152. When there are duplicate transaction messages received from the message queue, as indicated at block 154, the database of the second service may only store the results of one of the duplicate transaction messages.

In some cases, determining whether there are duplicate transaction messages received from the message queue (at block 152) includes recording each of the transaction messages in a second transaction table that includes a transaction entry for each transaction message, wherein each transaction entry includes a unique transaction identifier of the corresponding transaction message. For each transaction message received from the message queue, checking whether the second transaction table already has a transaction entry that has a matching transaction identifier, and if so, determining there are duplicate transaction messages received from the message queue.

In some cases, the method 140 may further include scheduling when the transaction messages are provided to the message queue. The transaction messages may be scheduled to be provided to the message queue at periodic times, for example. Storing results in the database of the first service (block 144) may be performed using a database transaction that ensure data consistency, and storing results in the database of the second service may be performed using a database transaction that ensure data consistency. In some instances, the first service and the second service are distributed microservices that operate asynchronously.

ADDITIONAL EXAMPLES

Example 1. A system for maintaining data consistency between a first microservice with a first microservice database and a second microservice with a second microservice database, wherein the first microservice operates asynchronously with the second microservice, and the first microservice initiates transactions that are to be processed by the second microservice, the system comprising:

a transaction initiator configured to process transactions of the first microservice, wherein at least some of the transactions of the first microservice, when processed, update the first microservice database and also produce corresponding transaction messages for processing by the second microservice, the transaction initiator recording the transaction messages in a first transaction table that includes a transaction entry for each transaction message in the first transaction table, and each transaction entry in the first transaction table includes a corresponding transaction identifier and a transaction message status, wherein the transaction message status designates finished or unfinished;

a transaction executor configured to access the first transaction table and provide the transaction messages that have a transaction message status of unfinished into a message queue, the transaction executor configured to update the transaction message status in the first transaction table to finished for those transaction messages that have been placed in the message queue;

a transaction processor configured to receive the transaction messages from the message queue and to process those transaction messages using the second microservice, wherein at least some of the transaction messages, when processed, update the second microservice database, the transaction processor further configured to record each of the transaction messages in a second transaction table that includes a transaction entry for each transaction message, wherein each transaction entry includes the transaction identifier of the corresponding transaction message; and wherein the transaction processor is further configured to check, for each transaction message received from the message queue, whether the second transaction table already has a transaction entry that has a matching transaction identifier, and if so, cause the second microservice database to include updates from only one of the matching transactions.

Example 2. The system of example 1, wherein the transaction initiator updates the first microservice database, produces the corresponding transaction messages and records the transaction messages in the first transaction table via one or more database transactions that ensure data consistency.

Example 3. The system of example 1, wherein the transaction processor updates the second microservice database and records each of the transaction messages in the second transaction table via one or more database transactions that ensure data consistency.

Example 4. The system of example 1, wherein the transaction executor includes a schedule service that schedules when the transaction executor accesses the first transaction table and provides the transaction messages that have a transaction message status of unfinished into the message queue.

Example 5. The system of example 4, wherein the schedule service schedules the transaction executor to accesses the first transaction table and provides the transaction messages that have a transaction message status of unfinished into the message queue at predetermined scheduled times.

Example 6. The system of example 5, wherein the predetermined scheduled times include periodic times.

Example 7. The system of example 6, wherein the periodic times includes once every 10 minutes.

Example 8. The system of example 1, wherein each transaction entry in the first transaction table further includes transaction data.

Example 9. The system of example 8, wherein the transaction data includes workorder data that corresponds to the corresponding transaction message.

Example 10. The system of example 1, wherein at least some of the transactions of the first microservice are initiated by a corresponding alarm issued by a building management system.

Example 11. A method of communicating transaction data between a first service and a second service, the method comprising:

receiving transactions of a first service;

processing the received transactions and storing the results in a database of the first service;

for at least some of the received transactions, producing corresponding transaction messages for processing by the second service, and tracking that each of the transaction messages is provided to a message queue;

receiving the transaction messages from the message queue;

processing the received transaction messages using the second service and storing the results in a database of the second service; and when there are duplicate transaction messages received from the message queue, causing the database of the second service to only store the results of one of the duplicate transaction messages.

Example 12. The method of example 11, wherein tracking that each of the transaction messages is provided to the message queue comprises storing each of the transaction messages in a first transaction table, wherein each entry of the first transaction table includes a transaction message status of unfinished or finished, wherein the transaction message status is updated to finished when the corresponding transaction message is provided to the message queue.

Example 13. The method of example 11, further comprising determining whether there are duplicate transaction messages received from the message queue.

Example 14. The method of example 13, wherein determining whether there are duplicate transaction messages received from the message queue comprises:

recording each of the transaction messages in a second transaction table that includes a transaction entry for each transaction message, wherein each transaction entry includes a transaction identifier of the corresponding transaction message; and check, for each transaction message received from the message queue, whether the second transaction table already has a transaction entry that has a matching transaction identifier, and if so, there are duplicate transaction messages received from the message queue.

Example 15. The method of example 11, further comprising scheduling when the transaction messages are provided to the message queue.

Example 16. The method of example 15, wherein the transaction messages are scheduled to be provided to the message queue at periodic times.

Example 17. The method of example 11, wherein storing results in the database of the first service is performed using a database transaction that ensure data consistency, and storing results in the database of the second service is performed using a database transaction that ensure data consistency.

Example 18. The method of example 11, wherein the first service and the second service are distributed microservices that operate asynchronously.

Example 19. A system for communicating transaction data between a first service and a second service, the system comprising:

a transaction initiator configured to receive transactions from a first service, the transaction initiator including:
  a first transaction table, the transaction initiator configured to store transaction messages corresponding to the received transactions within the first transaction table, the first transaction table including for each transaction message a transaction message status; and
  a first database;
  wherein the transaction initiator updates the first database and stores the transaction messages within the first transaction table in a first database transaction;

a transaction executor configured to start a schedule service in which the transaction executor is configured to:
  for each of those transaction messages in the first transaction table that have a transaction message status of unfinished:
    send the transaction messages to a message queue;
    update the transaction message status to finished; and a transaction processor configured to receive transaction messages from the message queue, each transaction message including a corresponding transaction identifier, the transaction processor including:
  a second transaction table;
  a second database;
  wherein the transaction processor is configured to, in response to receiving a transaction message from the message queue, update the second database and add the corresponding transaction identifier to the second transaction table in a second database transaction.

Example 20. The system of example 19, wherein when there are duplicate transaction messages received from the message queue, as indicated by a duplicate transaction identifier in the second transaction table, causing the transaction processor to only update the second database based on one of the duplicate transaction messages.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A system for maintaining data consistency between an alarm-generating platform with an alarm-generating platform database and a workorder-generating platform with a workorder-generating platform database, wherein the alarm-generating platform is separate from and operates asynchronously of the workorder-generating platform, and the alarm-generating platform initiates transactions that are to be processed by the workorder-generating platform, the system comprising:

one or more first memories for storing the alarm-generating platform database and one or more second memories for storing the workorder-generating platform database;

one or more processors operatively coupled to the one or more first and second memories, the one or more processors configured to:

process transactions of the alarm-generating platform, wherein at least some of the transactions of the alarm-generating platform, when processed, update the alarm-generating platform database and also produce corresponding transaction messages for subsequent processing by the workorder-generating platform, the transaction messages are recorded in a first transaction table that includes a transaction entry for each transaction message in the first transaction table, and each transaction entry in the first transaction table includes a corresponding transaction identifier and a transaction message status, wherein the transaction message status designates finished or unfinished, wherein each transaction entry in the first transaction table includes transaction data, the transaction data including workorder data that corresponds to the corresponding transaction message, and wherein at least some of the transactions of the alarm-generating platform include corresponding alarms issued by a building management system;

access the first transaction table and provide the transaction messages that have a transaction message status of unfinished into a message queue, and update the transaction message status in the first transaction table to finished for those transaction messages that have been placed in the message queue;

receive the transaction messages from the message queue and to process those transaction messages using the workorder-generating platform, wherein at least some of the transaction messages, when processed, update the workorder-generating platform database, and record asynchronously of recording transactions in the first transaction table each of the transaction messages in a second transaction table including a transaction entry for each transaction message, wherein each transaction entry in the second transaction table includes the transaction identifier of the corresponding transaction message; and check, for each transaction message received from the message queue, whether the second transaction table already has a transaction entry that has a matching transaction identifier, and if so, cause the workorder-generating platform database to include updates from only one of the matching transactions.

2. The system of claim 1, wherein the one or more processors are configured to update the alarm-generating platform database, produce the corresponding transaction messages and record the transaction messages in the first transaction table via one or more database transactions that ensure data consistency.

3. The system of claim 1, wherein the one or more processors are configured to update the workorder-generating platform database and record each of the transaction messages in the second transaction table via one or more database transactions that ensure data consistency.

4. The system of claim 1, wherein one or more processors are configured to schedule when the first transaction table is accessed to provide the transaction messages that have a transaction message status of unfinished into the message queue.

5. The system of claim 4, wherein one or more processors are configured to schedule when the first transaction table is accessed to provide the transaction messages that have a transaction message status of unfinished into the message queue at predetermined scheduled times.

6. A method of communicating transaction data between an alarm-generating service and a workorder-producing service, wherein the alarm-generating service and the workorder-generating service are distributed microservices that operate asynchronously, the method comprising:

receiving transactions of the alarm-generating service;

processing the received transactions and storing the results in a first database of the alarm-generating service;

for at least some of the received transactions, producing corresponding transaction messages for processing by the workorder-generating service, and tracking that each of the transaction messages is provided to a message queue via a first transaction table, wherein each entry of the first transaction table includes a transaction message status of unfinished or finished, wherein the transaction message status is updated to finished when the corresponding transaction message is provided to the message queue;

receiving the transaction messages from the message queue;

processing the received transaction messages using the workorder-generating service, storing the results in a second database of the workorder-generating service, and tracking each of the transaction messages received from the message queue via a second transaction table, wherein the second transaction table tracks the transaction messages received from the message queue asynchronously from the first transaction table tracking the transaction messages provided to the message queue;

determining whether there are duplicate transaction messages received from the message queue in the second transaction table, including recording each of the transaction messages in the second transaction table including a transaction entry for each transaction message, wherein each transaction entry includes a transaction identifier of the corresponding transaction message; and checking, for each transaction message received from the message queue in the second transaction table, whether the second transaction table already has a transaction entry that has a matching transaction identifier, and if so, determine that there are duplicate transaction messages received from the message queue; and when there are duplicate transaction messages received from the message queue, causing the second database of the workorder-generating service to only store the results of one of the duplicate transaction messages.

7. The method of claim 6, further comprising scheduling when the transaction messages are provided to the message queue.

8. The method of claim 7, wherein the transaction messages are scheduled to be provided to the message queue at periodic times.

9. The method of claim 6, wherein storing results in the first database of the alarm-generating service is performed using a database transaction that ensures data consistency, and storing results in the second database of the workorder-generating service is performed using a database transaction that ensures data consistency.

10. The system of claim 5, wherein the predetermined scheduled times include periodic times.

11. The system of claim 10, wherein the periodic times includes once every 10 or more minutes.

12. A system for communicating transaction data between a first service and a second service, the system comprising:

one or more processors and one or more memories configured to implement a transaction initiator, a transaction executor and a transaction processor, wherein:

the transaction initiator is configured to receive transactions from a first service, at least some of the transactions from the first service being initiated by a corresponding alarm issued by a building management system, the transaction initiator including:

a first transaction table, the transaction initiator configured to store transaction messages corresponding to the received transactions within the first transaction table, the first transaction table including for each transaction message a transaction message status; and a first database;

wherein the transaction initiator updates the first database and stores the transaction messages within the first transaction table in a first database transaction;

the transaction executor is configured to start a schedule service in which the transaction executor is configured to:

for each of those transaction messages in the first transaction table that have a transaction message status of unfinished:

send the transaction messages to a message queue;

update the transaction message status to finished; and the transaction processor is configured to receive transaction messages from the message queue, each transaction message including a corresponding transaction identifier, the transaction processor including:

a second transaction table;

a second database distinct from the first database;

wherein the transaction processor is configured to, in response to receiving a transaction message from the message queue, update the second database and add asynchronously of recording transactions in the first transaction table the corresponding transaction identifier to the second transaction table in a second database transaction; and wherein when there are duplicate transaction messages received from the message queue, as indicated by a duplicate transaction identifier in the second transaction table, the transaction processor is configured to only update the second database based on one of the duplicate transaction messages.

* * * * *